United States Patent [19]

Pan et al.

[11] Patent Number: 5,727,109
[45] Date of Patent: Mar. 10, 1998

[54] OPTICAL ATTENUATOR WITH LOW POLARIZATION MODE DISPERSION

[75] Inventors: Jing-Jong Pan; Ming Shih, both of Milpitas, Calif.

[73] Assignee: E-Tek Dynamics, Inc., San Jose, Calif.

[21] Appl. No.: 665,808

[22] Filed: Jun. 19, 1996

Related U.S. Application Data

[62] Division of Ser. No. 548,820, Oct. 26, 1995, Pat. No. 5,557,692, which is a continuation of Ser. No. 250,323, May 27, 1994, abandoned, which is a continuation of Ser. No. 6,893, Jan. 21, 1993, abandoned.

[51] Int. Cl.[6] ............................................. G02B 6/00
[52] U.S. Cl. ............................ 385/140; 385/11; 349/196
[58] Field of Search .............................. 385/11, 16, 31, 385/33, 34, 140; 372/703; 359/281, 282, 283, 484, 494–497; 349/196, 197

[56] References Cited

U.S. PATENT DOCUMENTS

| | | | |
|---|---|---|---|
| 4,239,329 | 12/1980 | Matsumoto | 385/11 |
| 4,364,639 | 12/1982 | Sinclair et al. | 385/16 |
| 4,410,238 | 10/1983 | Hanson | 385/39 |
| 4,548,478 | 10/1985 | Shirasaki | 359/384 |
| 5,015,057 | 5/1991 | Rumbaugh et al. | 359/41 |
| 5,208,876 | 5/1993 | Pan | 385/11 |
| 5,237,445 | 8/1993 | Kuzuta | 359/484 |
| 5,276,747 | 1/1994 | Pan | 385/34 |
| 5,278,853 | 1/1994 | Shirai et al. | 372/703 |
| 5,315,431 | 5/1994 | Masuda et al. | 359/484 |
| 5,446,578 | 8/1995 | Chang et al. | 372/703 |
| 5,446,813 | 8/1995 | Lee et al. | 385/31 |
| 5,557,692 | 9/1996 | Pan et al. | 385/11 |
| 5,559,633 | 9/1996 | Emkey | 372/703 |

*Primary Examiner*—Rodney B. Bovernick
*Assistant Examiner*—Hemang Sanghavi
*Attorney, Agent, or Firm*—Townsend and Townsend and Crew LLP

[57] ABSTRACT

An improved optical attenuator minimizes polarization mode dispersion in optical signals carried by optical fiber systems. The optical signals are expanded and refocussed by GRIN lenses, and the attenuator makes use of a liquid crystal cell disposed between birefringent polarizers for polarization-independent attenuation or switching. A birefringent plate compensates for dispersion of the ordinary and extra-ordinary rays within the attenuator. The plate will often be disposed at an oblique angle to minimize walk-off between these rays.

16 Claims, 8 Drawing Sheets

REFRACTIVE INDICES OF SOME TYPICAL CRYSTALS

| | WAVELENGTH (nm) | $n_o$ | $n_e$ |
|---|---|---|---|
| POSITIVE RUTILE (TiO$_2$) | 396.8 | 3.0128 | 3.4261 |
| | 434.0 | 2.8587 | 3.2232 |
| | 486.1 | 2.7346 | 3.0631 |
| | 527.0 | 2.6738 | 2.9857 |
| | 589.0 | 2.6131 | 2.9089 |
| | 656.1 | 2.5710 | 2.8560 |
| NEGATIVE CALCITE (CaCO$_3$) | 546.1 | 1.6617 | 1.4879 |
| | 579.1 | 1.6591 | 1.4867 |
| | 589.3 | 1.6584 | 1.4864 |
| | 656.3 | 1.6544 | 1.4846 |
| | 706.5 | 1.6521 | 1.4836 |
| | 800.7 | 1.6487 | 1.4821 |
| | 904.7 | 1.6458 | 1.4810 |
| | 1041.7 | 1.6428 | 1.4798 |
| LiNbO$_3$ | 706.5 | 2.2699 | 2.1886 |
| | 809.3 | 2.2541 | 2.1749 |
| | 871.7 | 2.2471 | 2.1688 |
| | 960.0 | 2.2393 | 2.1622 |
| | 1014.0 | 2.2351 | 2.1584 |
| | 1092.1 | 2.2304 | 2.1545 |
| | 1157.9 | 2.2269 | 2.1515 |
| | 1287.8 | 2.2211 | 2.1464 |
| | 1440.0 | 2.2151 | 2.1413 |
| | 1638.2 | 2.2083 | 2.1366 |

OPTICAL ATTENUATOR WITH LOW POLARIZATION MODE DISPERSION

This is a Divisional of U.S. application Ser. No. 08/548,820, filed Oct. 26, 1995, U.S. Pat. No. 5,557,692, which is a Continuation of U.S. application Ser. No. 08/250,323, filed May 27, 1994, now abandoned, which is a File Wrapper Continuation of U.S. application Ser. No. 08/006,893, filed Jan 21, 1993, now abandoned.

BACKGROUND OF THE INVENTION

The present invention relates to optical fiber technology and, more particularly, to optical isolators useful in blocking reflections of optical signals generated by a laser through an optical fiber.

A recurring problem in optical fiber networks is the dispersion of the optical, i.e., light, signal in the optical fiber. Through dispersion the different components of an optical signal are spread out. For example, distance can cause dispersion of a signal traveling along an optical fiber. If left unchecked or uncompensated for, what was once a sharp signal at transmission arrives as a blurry or indefinite signal at reception. A digital signal train of logic "ones" and "zeroes" may arrive as an indistinct series of signal oscillations between "three-fourths" and "one-fourth" logic values.

Dispersion can arise from many different sources. Many of these problems have been essentially solved or avoided. However, one source which has been largely overlooked thus far is one of the common elements in a fiber optic network, the optical isolator.

In present day optical fiber technology, semiconductor lasers are typically used to generate and to relay light signals on optical fibers. These lasers are particularly susceptible to light signal reflections, which cause a laser to become unstable and noisy. Optical isolators are used to block these reflected signals from reaching the laser. Ideally, these optical isolators transmit all of the light signals in the forward direction and block all of the signals in the reverse direction.

Many of these optical isolators use the polarization modes of a light signal as a mechanism to block reflected signals. The present invention recognizes that as distances over which optical signals are transmitted lengthen and as signal transmission rates increase, these optical isolators may create dispersion problems. Stated differently, with the wide application of optical isolators in present day, high-speed optical communication networks over long distances, the problem of polarization mode dispersion is expected to become more evident.

The present invention solves or substantially mitigates these problems by providing for an optical isolator with reduced polarization mode dispersion.

SUMMARY OF THE INVENTION

The present invention provides for a compensating element in the form of a birefringent plate in an optical isolator which uses a first GRIN lens to collimate the light signal from an input optical fiber, a first birefringent polarizer wedge, an optical Faraday rotator, a second birefringent polarizer wedge, and a second GRIN lens to recollimate the light signal to an output optical fiber. Polarization mode dispersion through said optical isolator is substantially reduced by arranging the fast optical axis of the plate to be perpendicular to the fast optical axis of the polarizer on the same side of the Faraday rotator as the plate and selecting the thickness of the plate in a predetermined manner. In this manner the optical distances of light rays in different polarization modes are equalized. The present invention also allows for minimization of "walk-off", which also contributes to some polarization mode dispersion through the isolator.

The plate can be formed from various birefringent materials, such as lithium niobate and rutile, and disposed in various arrangements with the elements of the optical isolator. A plate of lithium niobate attached to the second polarizer wedge is believed to provide the best combination of performance and ease of manufacturing assembly.

BRIEF DESCRIPTION OF THE DRAWINGS

FIG. 11A illustrates the operation of the liquid crystal cell in the optical switch/attenuator when turned on.

DESCRIPTION OF THE PREFERRED EMBODIMENT(S)

Figure 1:
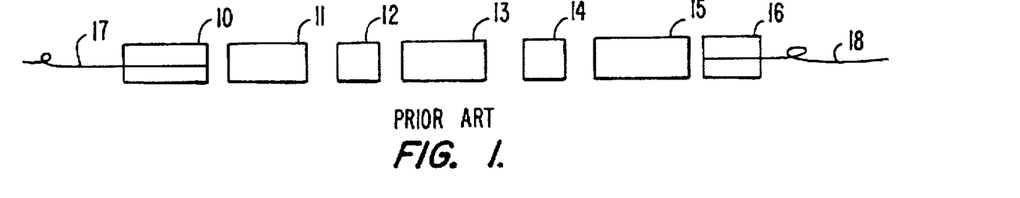
FIG. 1 is a representational diagram of an optical isolator of a type presently in use.

FIG. 1 is a cross-sectional view of a representative optical isolator of a type which uses the polarization modes of an incoming optical signal for one-way transmission. The optical isolator is placed in the path of an optical fiber, here shown as an input fiber 17 and an output fiber 18, to transmit light signals from the input fiber 17 to the output fiber 18 and to block light signals from the output fiber 18 to the input fiber 17. The polarization modes of these optical signals are used to block any reflected signals.

The optical isolator has a glass ferrule 10 into which the input fiber 17 is inserted. The ferrule 10 helps align the fiber 17. Signals from the end of the input fiber 17 are transmitted by a first GRIN (Graded Index) lens 11 which collimates the light from the end of the fiber 17. The collimated light from the GRIN lens 11 is then passed through a polarizer 12 in the form of a birefringent crystal wedge.

Figure 2A:
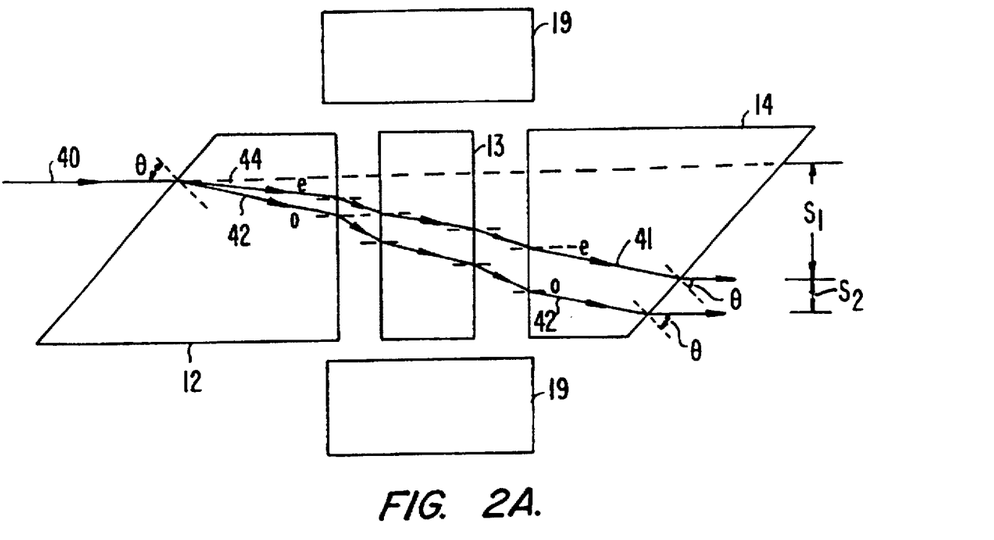
FIG. 2A illustrates a forward path of a light ray through the central elements of the optical isolator of FIG. 1.

As shown in FIG. 2A, which better shows the operation of the optical isolator, the collimated light is represented by an incident beam 40 upon the polarizer 12. The polarizer 12 separates the incident light from the GRIN lens 11 into a first ray, represented by a ray 42 in FIG. 2A, which is polarized along the crystal's optical axis and designated as the ordinary ray, and a second ray, represented as a ray 41 in FIG. 2A, which is polarized perpendicularly to the optical axis and designated the extraordinary ray.

Separation occurs because the birefringent crystal has two indexes of refraction, one for the light polarized along the optical axis, $n_o$, and another for the light polarized perpendicularly to the optical axis, $n_e$. The axis of birefringent material having the smaller index of refraction is sometimes called the "fast" axis, in contrast to the axis having the larger index of refraction. Both rays 41 and 42, i.e., the light from the polarizer 12, are then rotated 45° by a Faraday rotator 13. The rotator 13 is typically formed from garnet doped with impurities or, alternatively, YIG, placed in a permanent magnet represented by blocks 19.

The rotated light is further separated and recollimated by a second polarizer 14, sometimes called an analyzer. Like the polarizer 12, the second polarizer 14 is formed by a birefringent crystal wedge. The optical axis of this birefringent crystal is oriented 45° with respect to the optical axis of the first polarizer 12. Thus the ordinary ray 42 from the first polarizer 12 is also the ordinary ray 42 of the second polarizer 14 and the extraordinary ray 41 from the first polarizer 12 is the extraordinary ray 41 of the second polarizer 14. The net result is that after traveling from the first polarizer 12 through the second polarizer 14, the two collimated rays are displaced from each other. The two rays are then combined and refocused by a second GRIN lens 15 to a point on the end of the output fiber 18. Again, the end of the output fiber 18 is aligned by a glass ferrule 16.

Figure 2B:
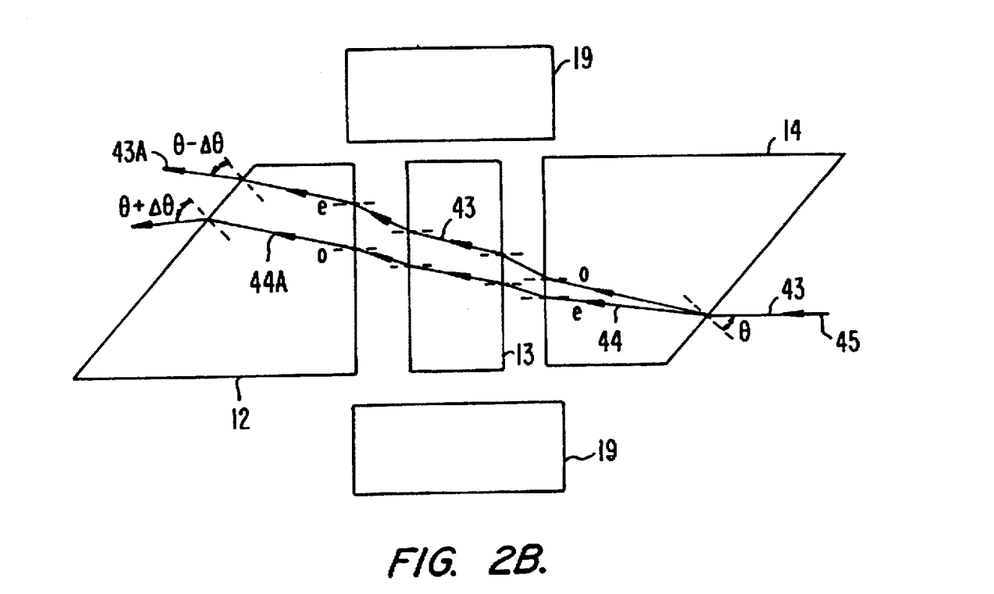
FIG. 2B illustrates a backward path of a light ray through the central elements the optical isolator of FIG. 2A.

As shown in FIG. 2B, in the reverse direction, light from the output fiber 18, represented by a ray 45, is separated by the polarizer 14 into two, an ordinary ray 43 polarized along the optical axis of the polarizer 14, and an extraordinary ray 44 polarized perpendicularly to the optical axis. When passing back through the Faraday rotator 13, the light in both rays 43 and 44 is rotated 45°. This rotation is nonreciprocal with the rotation of light in the forward direction, so that the ordinary ray 43 from the second polarizer 14 is polarized perpendicularly with the optical axis of the first polarizer 12 and the extraordinary ray 44 from the second polarizer 14 is polarized with the optical axis of the first polarizer 12. The ordinary and extraordinary rays 43 and 44 from the second polarizer 14 incident upon the first polarizer 12 have exchanged places. In the polarizer 12, the ordinary ray is marked with the reference numeral 43A and extraordinary ray marked with 44A to indicate that these light rays are polarized 90° from their respective polarization planes.

Because of this exchange, the light, in passing through the first polarizer 12, does not leave the polarizer 12 in parallel rays. This is shown by the differing angles of refraction, $\theta \pm \Delta \theta$, for the two rays 43A and 44A leaving the polarizer 12. The non-parallel light is focused by the GRIN lens 11 at points which are not located at the end of the input fiber 10. Thus light in the reverse direction is not passed back into the input fiber 10. For a more detailed explanation of this type of optical isolator, see U.S. Ser. No. 07/786,434, entitled, "AN IMPROVED OPTICAL ISOLATOR," filed Nov. 1, 1991 by the present inventor and assigned to the present assignee.

By definition, a birefringent crystal has the two different indices of refraction which give rise to the ordinary ray and the extraordinary ray. The present invention recognizes that the path of split light rays through the optical isolator may have two different optical distances. Therefore, even though the signal is recombined later by the GRIN lens 15, the signal now has one mode of polarization ahead of, or behind, the other. There is a time delay between the two polarization modes and the signal has become dispersed. As the signal travels through an optical fiber over passage of the optical signal through long distances, the dispersion effect is increased. Furthermore, numerous optical repeaters with isolators in the fiber optic network further compound the problem.

FIG. 2A also illustrates another, more subtle source of dispersion. The incident beam 40 is split and two rays 41 and 42 leave the second polarizer 14 to be combined by the second GRIN lens 15. It should be noted that the two rays 41 and 42 are displaced from original line of travel of the incident beam 40 by $s_1$, and $s_1+s_2$, respectively. The difference, $s_2$, in the displacement between the extraordinary ray 41 and ordinary ray 42 is sometimes called "walk-off". Since the two rays 41 and 42, though nominally parallel to each other, do not enter the GRIN lens 15 at the same point due to walk-off, the two rays are not completely recombined by the GRIN lens 15. This causes dispersion of the optical signal in the output fiber 18. Thus it is desirable that walk-off also be minimized.

In the present invention a compensator plate is arranged with the central elements, i.e., the first and second polarizers and the rotator, of the described optical isolator so that the distances of the optical paths of the two polarization modes of a signal are equalized. The plate has a thickness d and is formed by a birefringent crystal having, by definition, two different indices of refraction. The plate, arranged on one side or the other of the rotator, is arranged so that its fast axis is perpendicular to the fast axis of the polarizer on the same side of the rotator. The thickness of the plate is chosen to substantially equalize the optical distances of the two polarization modes in the isolator and to minimize walk-off.

The compensator plate may be formed from the same material as the polarizers. In such a case, the optical axis, whether it is the fast axis or not, of the plate is arranged perpendicularly to the optical axis of the polarizer on the same side of the rotator. On the other hand, the compensator plate may be formed from a material having relative magnitudes of the indices of refraction opposite to that of the birefringent crystals of the first and second polarizers.

For example, as contemplated in one embodiment of the present invention, the polarizers are formed from lithium niobate which has its index of refraction for the ordinary ray greater that the index of refraction for the extraordinary ray ($n_o > n_e$). The compensating plate is formed from rutile which has its index of refraction for the ordinary ray less than the index of refraction for the extraordinary ray ($n_o < n_e$). In such a case the optical axis of the rutile compensator plate is arranged in parallel to the optical axis of the polarizer on the same side of the rotator. Note that plate's fast axis is still arranged perpendicularly to the fast axis of the polarizer.

Figure 3:
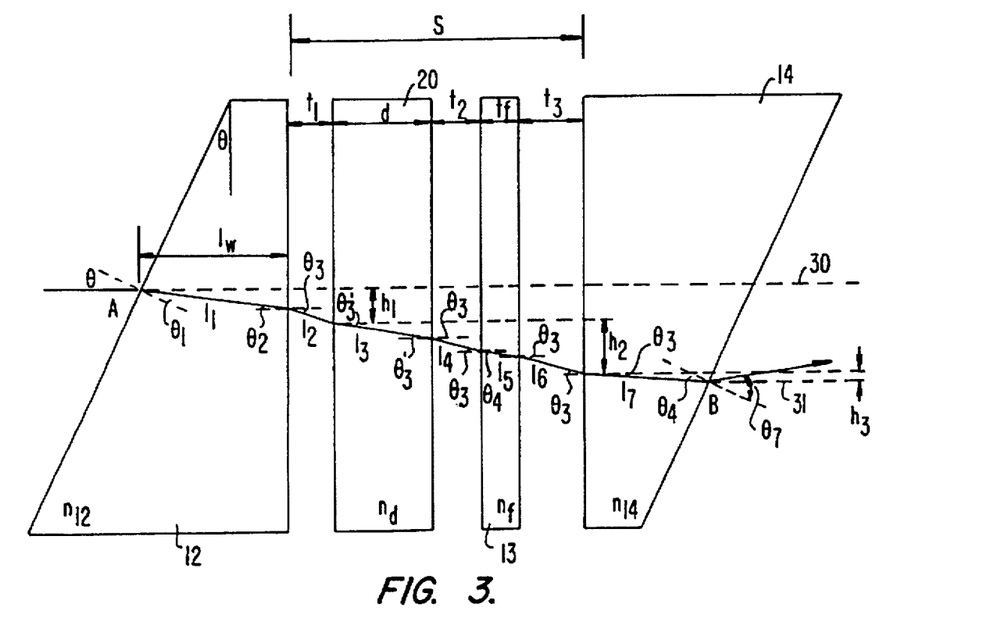
FIG. 3 shows a forward path of a light ray through the central elements of an optical isolator according to one embodiment of the present invention.

One embodiment of the present invention is shown in FIG. 3. A ray in the forward direction is traced to illustrate the operation of the present invention. For clarity of understanding, the same reference numerals are used in this and the following drawings for the elements serving the same function as that described in the previous drawings.

As shown in FIG. 3, a compensator plate 20 is arranged between the first polarizer 12 and the Faraday rotator 13. The first and second polarizers 12 and 14 are wedged-shaped at an angle $\theta$ with a midpoint thickness $l_w$. The plate 20 has a thickness d and the rotator 13 a thickness $t_r$. The blocks 19 for the permanent magnet are not shown. The separation between the first and second polarizers 12 and 14 is S and the spacing between the polarizer 12 and plate 20 is $t_1$, the spacing between the plate 20 and the rotator 13 is $t_2$, and between the rotator 13 and second polarizer 14 $t_3$. The refractive indices of the first polarizer 12, plate 20, rotator 13 and second polarizer 14 are $n_{12}$, $n_d n_r$, and $n_{14}$, respectively. The various angles of incidence and refraction of the ray through the central elements of the isolator are shown as $\theta_1$ through $\theta_7$.

From Snell's law, the total optical distance traveled by a ray in the forward direction through the central elements of the isolator is calculated as:

$$L = \sum_{k=1}^{7} n_k l_k \quad (1)$$

where $l_k$ is the physical distance traveled by the ray through the medium k and $n_k$ is the index of refraction for the medium k. In the embodiment of FIG. 3, there are seven media. Of course, the birefringent elements have two indices of refraction, and the index of refraction air is 1. The time for the ray traveling through the central elements of the optical isolator is given by $$T = \frac{L}{c} \quad (2)$$

where C is the speed of light in a vacuum.

The time dispersion between the ordinary and extraordinary light rays is determined by difference of the time travel arising from the ordinary and extraordinary indices of the birefringent materials in the compensation plate 20 and the polarizers 12 and 14. This difference is given, to a fair degree of accuracy, by the straightforward equation:

$$\tau_d = T_e - T_o = \frac{L_e - L_o}{C} \quad (3)$$

By a first order approximation, which is an excellent approximation for small angles ($\theta \leq 15°$)

$$\tau_d = \frac{2\Delta n \cdot l_w}{C} - \frac{\Delta n_d \cdot d}{C} \quad (4)$$

where $\Delta n$ represents the difference of the indices of refraction for the birefringent polarizers 12 and 14, and $\Delta n_d$ is the difference of the indices of refraction for the plate 20.

The first term in the equation (4) represents the time delay between two polarization modes generated without the compensation plate 20 and the second term represents the time delay generated from the compensation plate 20. A calculation of the time dispersion for a conventional optical isolator ($\Delta n = 0.1$ and $l_w = 0.8$ mm) without the compensation plate 20 yields a time delay of approximately 53 picoseconds.

To minimize or avoid polarization mode dispersion, the time delay $\tau_d$ should be as small as possible. This occurs when (1) the fast axis of the compensation plate 20 is perpendicular to the fast axis of the polarizer of the same side of the rotator 13, in this case, the first polarizer 12, (or, stated differently, the compensation plate 20 is arranged so that its operation on the two light rays cancels the dispersion effect of the other elements of the isolator,) and (2) the thickness d of the plate 20 determined as:

$$d = \frac{2\Delta n}{\Delta n_d} \cdot l_w \quad (5)$$

Figure 4:
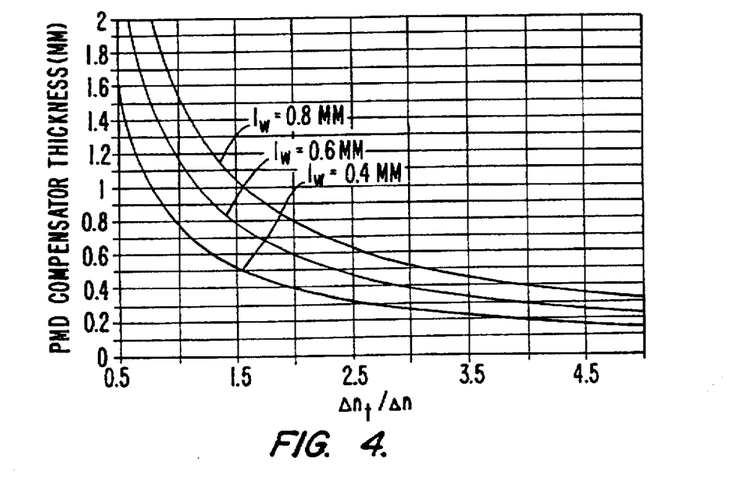
FIG. 4 is a graph showing the relationships between the various parameters of the central elements of the optical isolator of FIG. 3.

FIG. 4 shows this relationship between the d, the thickness of the plate 20, and $\Delta n/\Delta n_d$, the ratio of the birefringent indices, for several different values of the midpoint width, $l_w$, of the wedge-shaped polarizers 12 and 14.

Figure 5A:
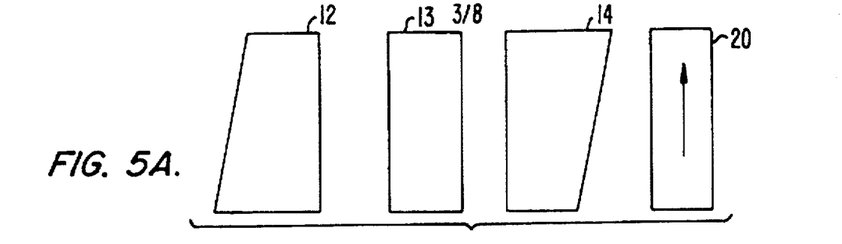
FIGS. 5A–5C illustrate different arrangements for the compensator plate according to the present invention.
Figure 5B:
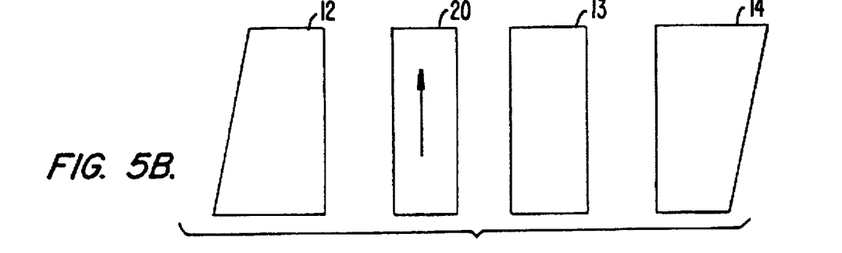
Figure 5C:
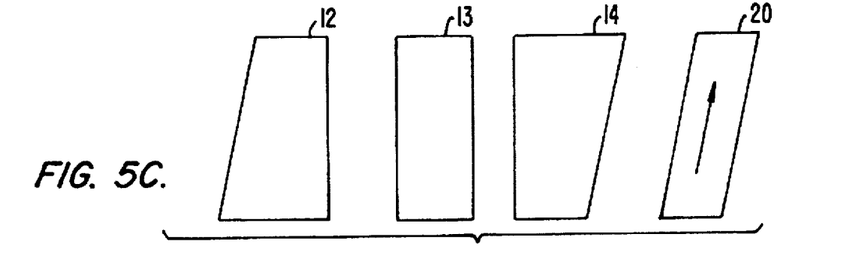

FIGS. 5A–5C illustrate various arrangements for the compensator plate 20 in the optical isolator. Of course, in all these arrangements, the fast axis of the plate 20 is perpendicular to the fast axis of the polarizer on the same side of the Faraday rotator 13. In FIG. 5A, for example, the fast axis of the plate 20 is perpendicular to the fast axis of the second polarizer 14. In FIG. 5B, the same arrangement as in FIG. 3, the fast axis of the plate 20 is perpendicular to the fast axis of the first polarizer 12, and the fast axis of the plate 20 is perpendicular to the polarizer 14 in FIG. 5C.

All these arrangements effectively reduce polarization mode dispersion. They have low insertion losses, as desired. The arrangements in FIGS. 5A and 5B have high reflection, while that of FIG. 5C is low. (Stated differently, the input return loss for the arrangements of 5A and 5B is low, while that for FIG. 5C is high.) Finally, it has been found that the arrangement in FIG. 5C is more effective in reducing walk-off than the arrangements in FIGS. 5A and 5B. For ease of assembly, it is typically desirable that the compensation plate 20 contact the polarizer with which the fast axes of the two elements are arranged. The arrangement in FIG. 5B may have the optical plate 20 separated from the polarizer 12 for easy assembly, but the arrangement in FIG. 5C is very difficult to assemble if the plate 20 is separated from the polarizer 14.

Figure 6:
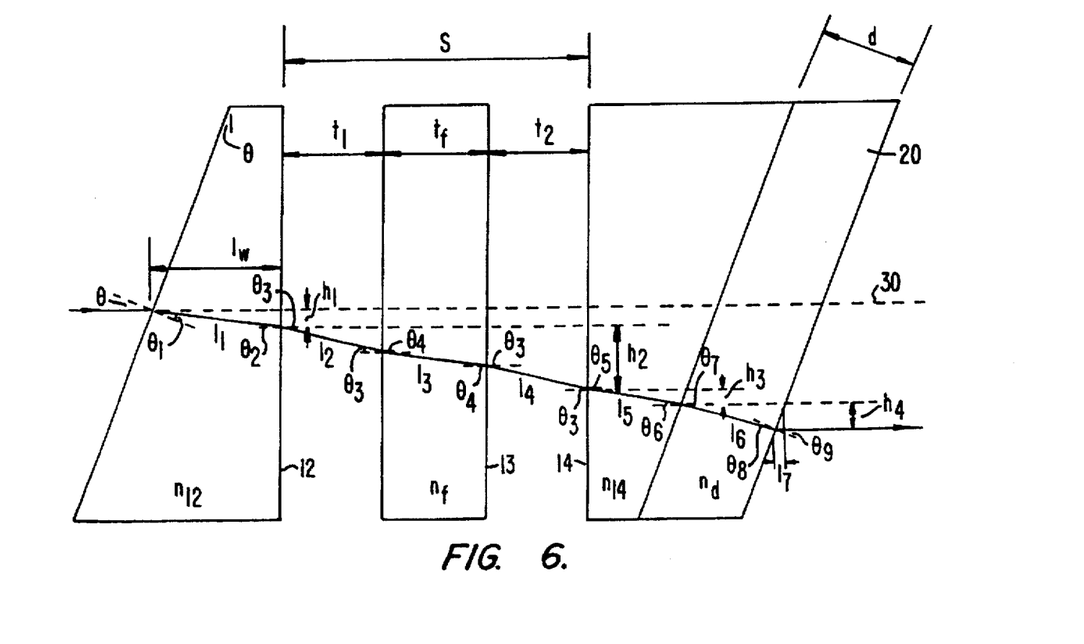
FIG. 6 shows a forward path of a light ray through the central elements of an optical isolator according to another embodiment of the present invention.

These considerations point to the arrangement of FIG. 5C for an optical isolator which has low polarization mode dispersion and which is easily assembled. FIG. 6 shows the details of such an arrangement in which the compensation plate 20 is in direct contact with the second polarizer 14. As in the arrangement of FIG. 3, an incident ray is traced through the first polarizer 12, Faraday rotator 13, second polarizer 14, and the compensation plate 20 to show how the optical distance, the resulting time dispersion and walk-off may be calculated using Snell's law. Using substantially the same reference parameters as in FIG. 3, the optical distance for the arrangement in FIG. 6 is:

$$L = \sum_{k=1}^{7} n_k l_k \quad (6)$$

for the transit of the ray through seven media, starting with the first polarizer 12. As described with respect to FIG. 3, the time dispersion, $\tau_d$, may be calculated for the ordinary and extraordinary rays by the difference in optical distances for the two rays and dividing by the speed of light. A subtle point which is accounted for, the difference in $n_7 l_7$, the slight difference that the ordinary and extraordinary rays must travel in air as they leave the plate 20, makes this calculation precise. As indicated in FIG. 6, $l_7 = h_4 \tan\theta$ and $n_7 = 1.0$.

Figure 7A:
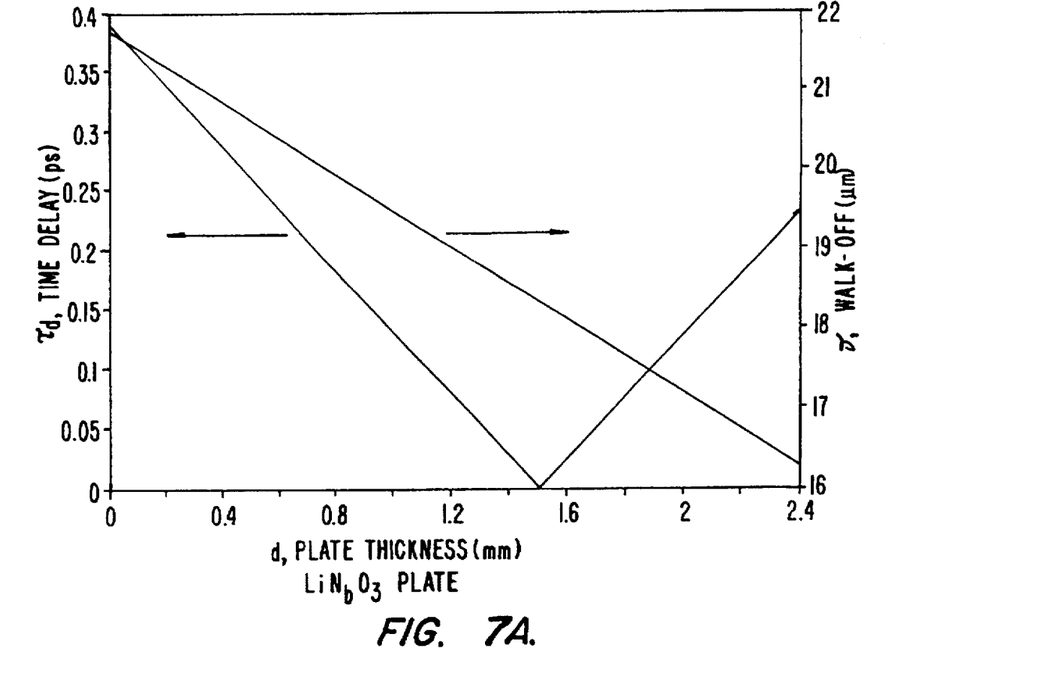
FIG. 7A is a graph illustrating the time delay and walk-off as a function of the thickness of the compensator plate formed from lithium niobate in the optical isolator illustrated in FIG. 6.
Figure 7B:
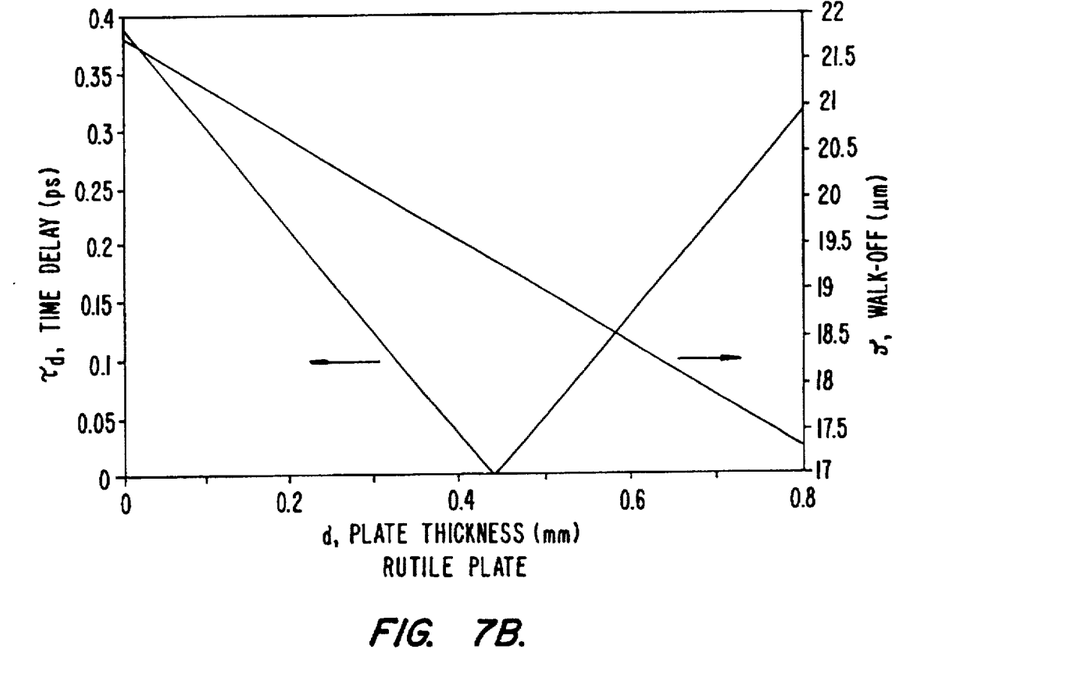
FIG. 7B is a similar graph in which the compensator plate is formed from rutile.

The walk-off, $\delta$, from the ordinary and extraordinary rays is:

$$\delta = |h_o - h_e| \quad (7)$$

where $h_o$ and $h_e$ are the total displacement of the ordinary and extraordinary rays from the original line 30 of travel, respectively. Using the displacement characters, $h_i$, in FIG. 6:

The results for a compensating plate of lithium $$\delta = \left| \sum_{k=1}^{4} h_{ko} - \sum_{k=1}^{4} h_{ke} \right| \quad (8)$$

niobate of $\tau_d$, the time dispersion, versus d, the thickness of the plate 20, are plotted in FIG. 7A. The polarizers 12 and 14 are also formed from lithium niobate with a wedge angle of 8°, the separation distance S is 2 mm and the Faraday rotator 13 has a thickness, $t_r$, of 1 mm. The same graph also shows the walk-off, δ, versus the thickness d of the plate 20. FIG. 7B shows the plot in which the compensating plate 20 is formed from rutile. All of the other operating parameter dimensions are the same as that for FIG. 7A.

Figure 8:
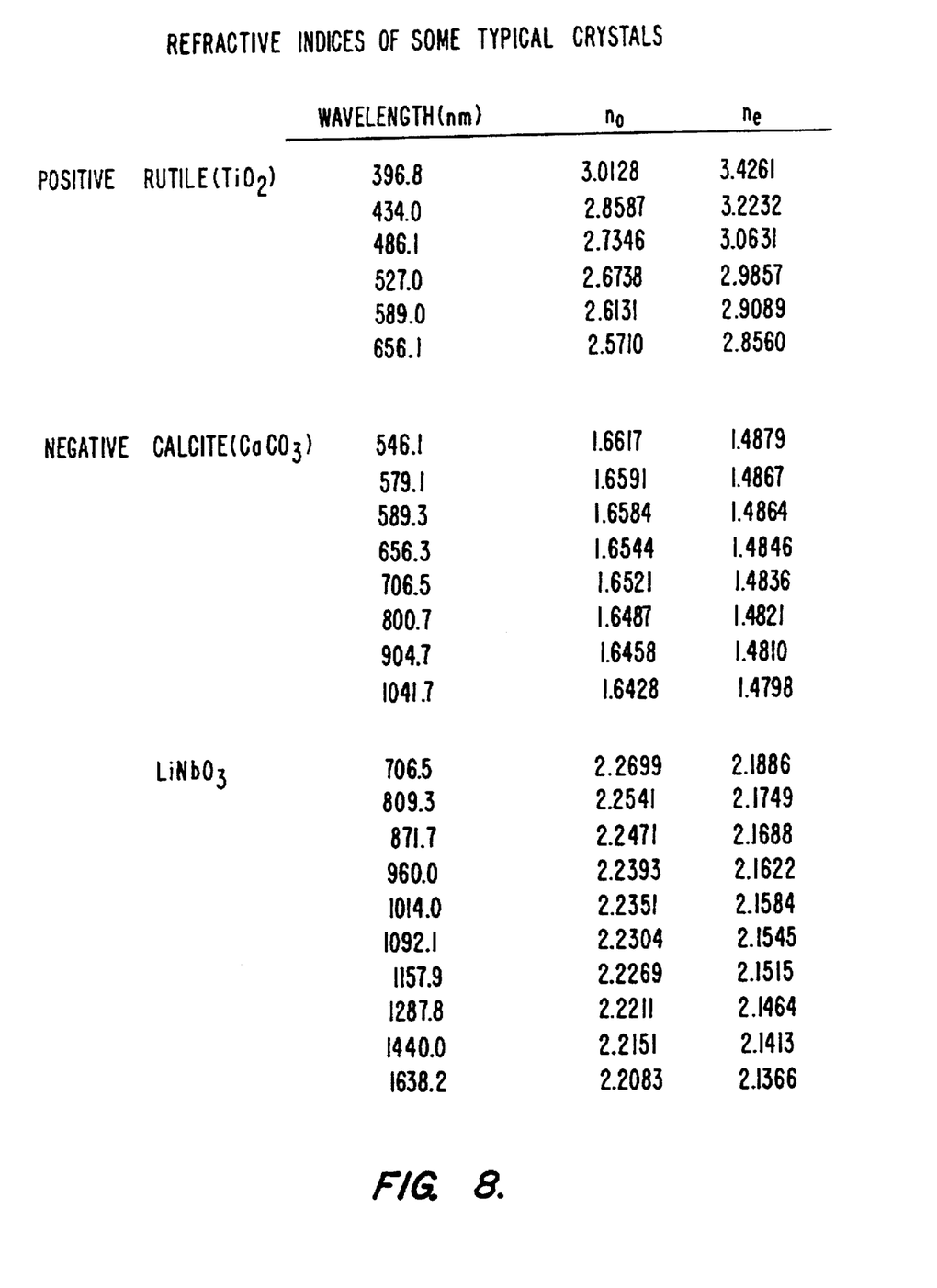
FIG. 8 is a table of materials and their indices of refraction which may be used for the birefringent elements in the optical isolator of the present invention.

FIG. 8 is table of refractive indices for three different birefringent materials, rutile, calcite, and lithium niobate, at different signal wavelengths. An interesting observation is that rutile has an index of refraction for the extraordinary ray greater than that of the ordinary ray, while the indices of refraction for calcite and lithium niobate are the reverse. From this table it is evident that various materials may be selected for the first polarizer, second polarizer and the compensating plate to construct an isolator according to its particular requirements to attain the benefits of the present invention. By selecting the proper parameters, it is possible that to eliminate the time dispersion, $\tau_d$, and to minimize the walk-off through the optical isolator. Polarization mode dispersion is substantially reduced.

The present invention may also be applied to devices which rely upon birefringence, other than optical isolators. One such device, a novel optical switch/attenuator, benefits from the present invention and is disclosed in a patent application, entitled "A POLARIZATION-INDEPENDENT OPTICAL SWITCH/ATTENUATOR", filed of even date by J. J. Pan and assigned to the present assignee. The patent application is incorporated by reference herein.

Figure 9:
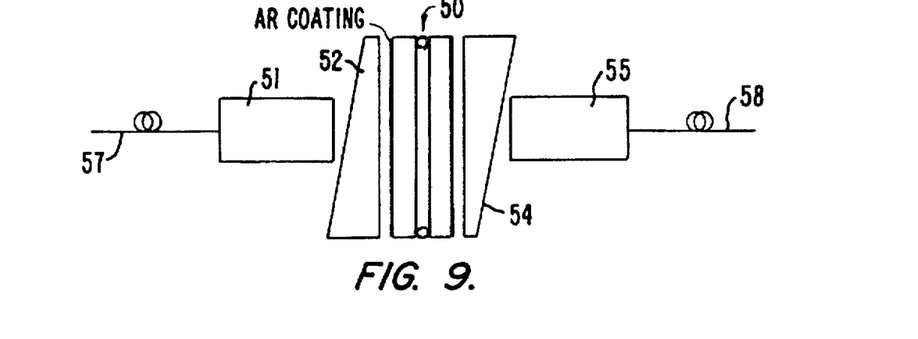
FIG. 9 is a representational drawing of an optical switch/attenuator which benefits from the present invention.

FIG. 9 is a representational drawing which shows the elements of the optical switch/attenuator in cross-section. The optical switch/attenuator has a similar arrangement to the optical isolator discussed above. There is a first GRIN (GRaded INdex) lens 51 associated with an input optical fiber 57, a second GRIN lens 55 associated with an output optic fiber 58, a first wedge-shaped birefringent polarizer 52, a liquid crystal cell 50, and a second wedge-shaped birefringent polarizer 54. The ferrules for holding the fibers 57 and 58 as shown in FIG. 1, for instance, are not shown. Responsive to a control signal, the liquid crystal cell 50 controllably rotates the light signals from the first GRIN lens 51.

Depending upon the resulting state of the liquid crystal cell 50, the optical signal may, or may not, be transmitted to the output fiber 58. In other words, an optical switch has been described. The strength of this signal can also be adjusted so that device operates as an attenuator.

Figure 10:
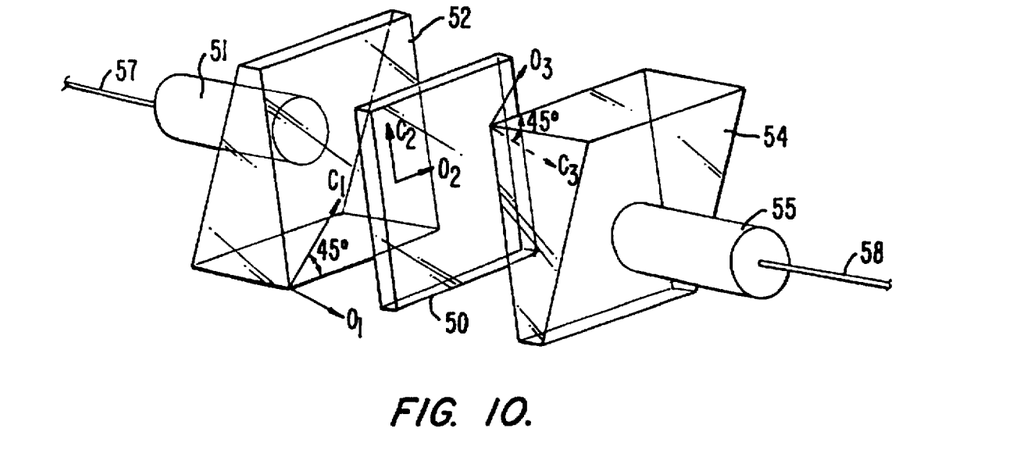
FIG. 10 illustrates the orientation of the optical axes of the elements of the optical switch/attenuator of FIG. 9.

FIG. 10 illustrates the orientation of the various optical axes of the polarizers 52 and 54 and the liquid crystal cell 50 of FIG. 9. The optical axis of the first polarizer 52, is arranged in an arbitrary direction perpendicular to the line of travel of the collimated light signal from the first GRIN lens 51. The optical axis of the second polarizer 54 is arranged so that it is rotated 90° from the optical axis of the first polarizer 52 and perpendicular to the line of travel of the collimated light beam. When the cell 50 is turned on, the optical axis of the liquid crystal is 45° from the optical axis of the first polarizer 52 and the cell 50 has a thickness such that there is a 180° phase retardation of the light signal as it travels through the cell 50.

Figure 11A:
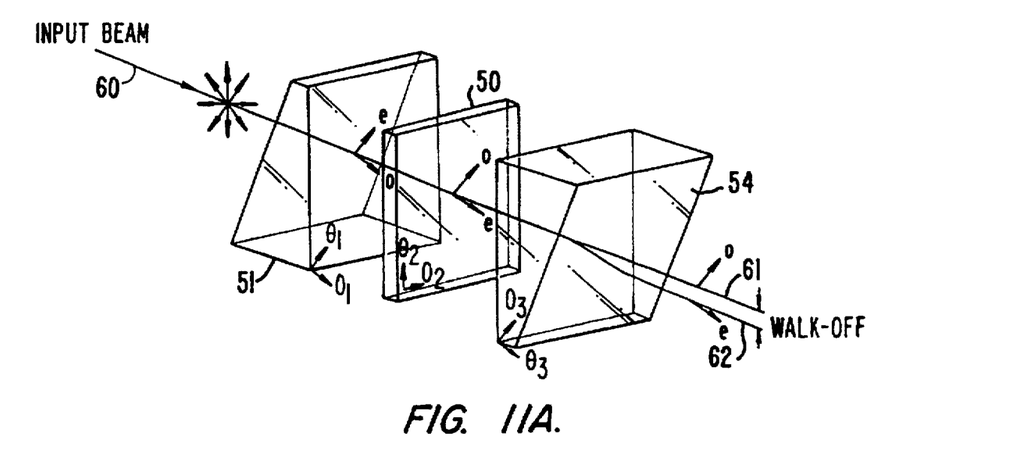
Figure 11B:
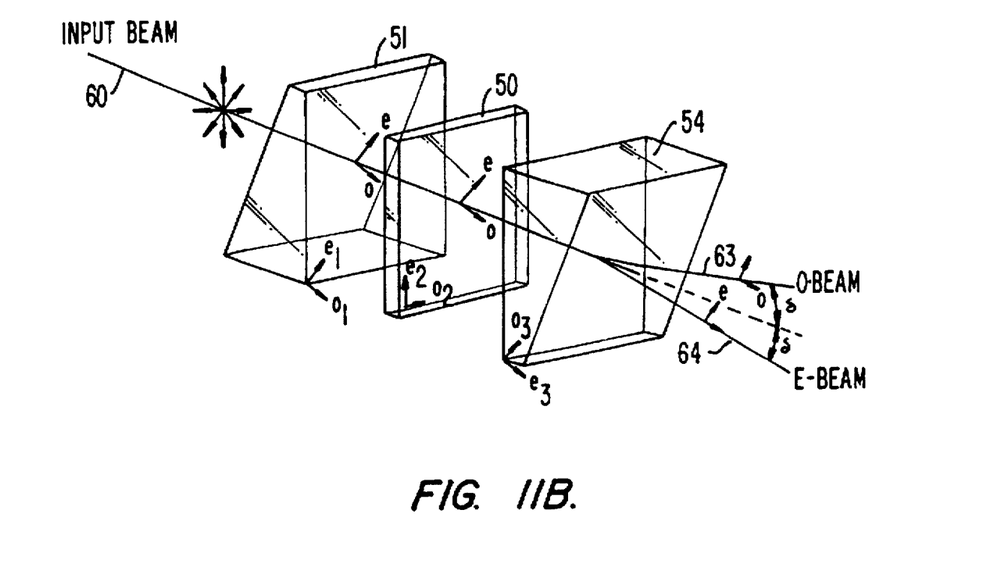
FIG. 11B illustrates the operation of the liquid crystal cell when turned off.

Operation of the optical switch according to the present invention is illustrated in FIGS. 11A and 11B. In FIG. 11A, the cell 50 is turned on so that the liquid crystals in the cell 50 are aligned. An incident beam 60 strikes the first birefringent polarizer 51 and is split into the two polarization modes, one for the extraordinary ray and the other for the ordinary ray. With the liquid crystal cell 50 turned on, the light signal is rotated 90°. In other words, the extraordinary light ray is polarized along the axis of the ordinary ray for the first polarizer 51 and the ordinary ray is now polarized along the extraordinary axis of the polarizer 51.

FIG. 11B illustrates the operation of the switch when the liquid crystal cell 50 is turned off. As in the previous case, the first polarizer 51 splits the incident light 60 into the two rays with polarization modes along the extraordinary and ordinary axes of the polarizer 51. Since the liquid crystal cell 50 is not turned on, the light from the first polarizer 51 passes through without effect. Since the second polarizer 54 has its optical axis arranged 90° with respect to the optical axis of the first polarizer 51, the extraordinary ray, polarized along the extraordinary axis of the first polarizer 51, coincides with the ordinary axis of the polarizer 54. The ordinary ray, the light polarized along the ordinary axis of polarizer 51, coincides with the extraordinary axis of the second polarizer 54. Thus, each ray has a different refractive index in the first and second polarizers 51 and 54. Therefore, the rays are deflected from the original line of travel from the first GRIN lens 51.

Due to the great sensitivity toward the incident angles on a GRIN lens, acting as a collimator/recollimator, the small deflected angles δ for both the extraordinary and ordinary beams generate a high attenuation. For all intents and purposes, no light is received by the output fiber 58 from the input fiber 57. The light from the input fiber 57 is blocked from the output fiber 58.

Figure 12A:
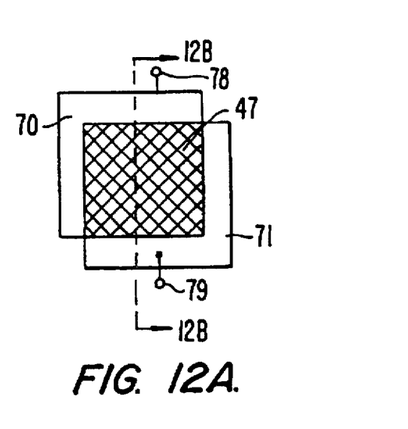
FIG. 12A is a diagrammatic front view of the liquid crystal cell of the switch/attenuator of FIG. 9.
Figure 12B:
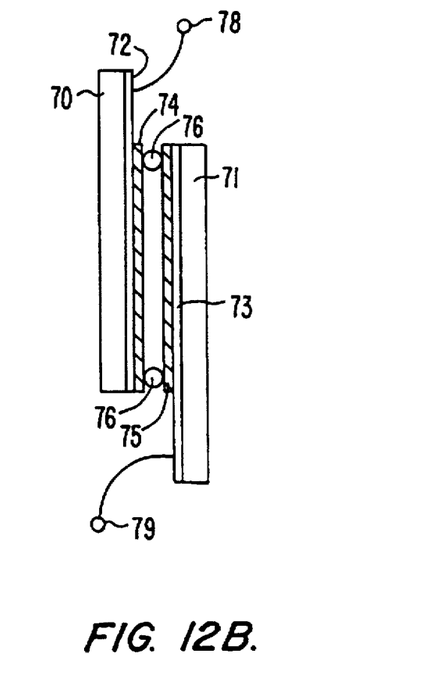
FIG. 12B is a cross-sectional side view of the liquid crystal cell of FIG. 12A.

FIGS. 12A and 12B show the details of the construction of the liquid crystal cell 50. As indicated in FIG. 9, the surface of the cell 50 facing the first GRIN lens 51 is coated with anti-reflection coating for better performance. FIG. 12A shows a front view of the cell 50 with the plate 70 closest to the viewer. The cross-hatched region 77 represents the region of the cell containing the liquid crystal material. A side view of the cell is shown in FIG. 12B indicated by the dotted line 11B–11B in FIG. 11A.

The cell 50 has glass plates 70 and 71, each having a surface facing the other covered respectively with a coating 72 and 73 of indium tin oxide. As shown in the drawings, the plates 70 and 71 are offset from each other to expose some of the coatings 72 and 73, which form transparent electrodes for the cell 50. Insulating layers 74 and 75 of polymer cover the portion of the coatings 72 and 73 which face each other. Polyimides may also be used for the layers 74 and 75. A spacer 76 formed from polystyrene beads between the plates 70 and 71 maintains a precise separation between the plates to form a cavity for the liquid crystal of the cell 50. Beads of 15.8 μm diameter from Polysciences, Inc. of Warrington, Iowa have been found to work satisfactorily as spacer material. Depending upon the thickness of the spacer 76, fiber rods and thin films of various materials, such as mylar, Kapton, polypropylene and polycarbonate, may be used for the spacer. UV(ultraviolet light)-cured epoxy binds the spacer 76 to the polymer layers 74 and 75 (and plates 70 and 71).

Since the plates 70 and 71 are not precisely aligned with each other, some portion of the electrically conductive coatings 72 and 73 are exposed. This permits control terminals 78 and 79 to be connected to the coatings, as indicated. Signals on the control terminals 78 and 79 create the electric fields between the coating electrodes for the controlled operation of the cell 50. Signals on the terminals 78 and 79 to create crystal-aligning electric fields in one direction or the other create the "on" and "off" state for the cell 50. Of course, these control signals, while plural, could be rendered into a single control signal by connecting one of the control terminals 78 and 79 to a reference potential, say ground, and driving the remaining control terminal positive or negative with respect to the grounded terminal.

For the contents of the cell 70, both nematic and smectic liquid crystals may be used. However, smectic C*-type liquid crystals are preferable. These liquid crystals are ferroelectric, i.e., they are self-polarizing and capable of reorientation with an externally applied electric field. It has been found that such ferroelectric liquid crystals can switch approximately a thousand times faster than a nematic liquid crystal. These ferroelectric liquid crystals also have a lower threshold voltage.

The present invention can be adapted to operate as a polarization-independent optical attenuator also. By suitably aligning the axes of the first polarizer 52, second polarizer 55 and the cell 50, the power of the optical signal from the input fiber 57 to the output fiber 58 can be reduced by a predetermined amount. In a sense, a switch is an attenuator in which the attenuation is complete.

One example of an attenuator has the cell 50 responsive to an analog control signal. In response to the strength of the control signal, the optical axis of the liquid crystal is rotated until the light signal from the first. polarizer is rotated 90°. Thus the light signal to the output fiber 58 from the input fiber 57 is attenuated directly proportional to the strength of the control signal. At full strength the signal is blocked completely. It is possible to have the control signal operate in a digitized manner so that the signal is attenuated in steps.

A variation of the described switch realigns the axes of the polarizers 52 and 55 with respect to each other. Even when the liquid crystal cell is turned on, not all of the light is blocked. Thus only a predetermined portion of the light, dependent upon the realignment of the axes, is blocked when the cell 50 is turned on. This effect can also be achieved by realigning the optical axis of the liquid crystal when turned on.

Figure 13A:
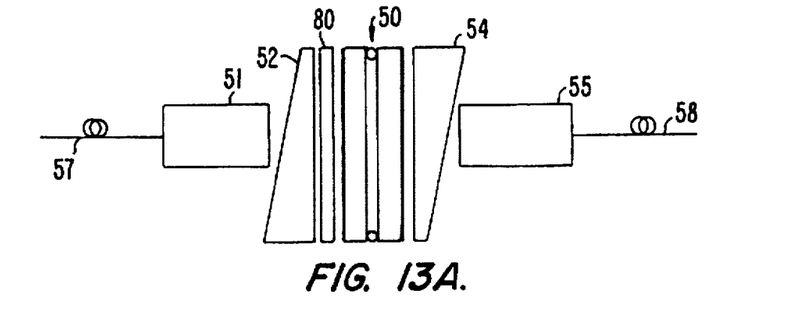
FIGS. 13A and 13B are diagrammatic side views of the optical switch/attenuator with a compensation plate in different locations in accordance with the present invention.
Figure 13B:
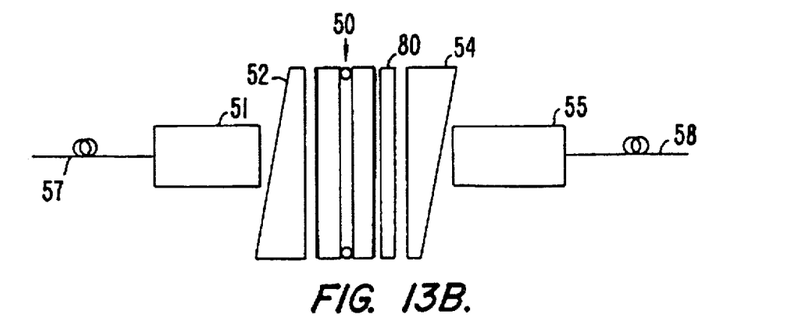
Figure 14A:
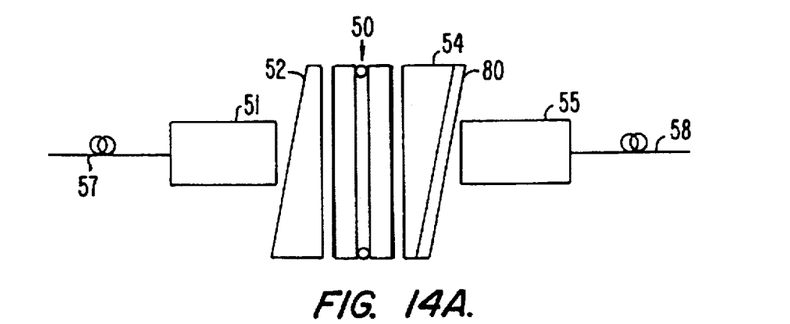
FIGS. 14A and 14B are diagrammatic side views of the optical switch/attenuator with a slanted compensation plate in different locations in accordance with the present invention.
Figure 14B:
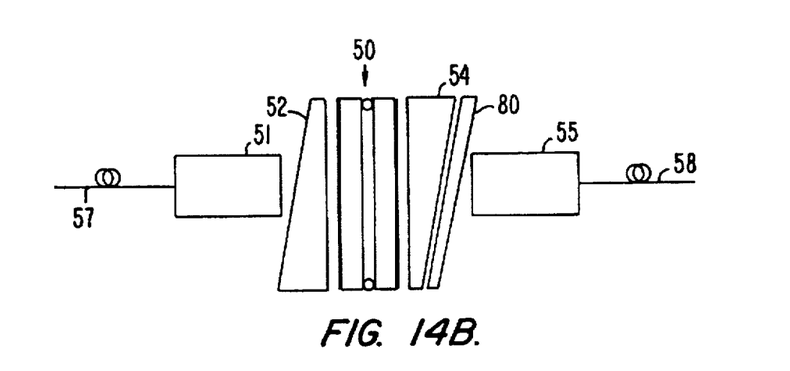

Since this switch/attenuator operates by the operation of the birefringent polarizers 51 and 55, it acts as a source for polarization mode dispersion described previously. With a compensation plate 80 of birefringent material located on either side of the liquid crystal cell 50, as shown in FIGS. 13A and 13B, polarization mode dispersion can be substantially reduced. FIGS. 14A and 14B illustrate other arrangements in which the compensation plate 80 is slanted placed in contact with the second polarizer 54 (FIG. 14A) and apart from the second polarizer 54 (FIG. 14B). The same calculations as discussed with respect to the optical isolator may be used to determine the correct dimensions and parameters of the compensation plate.

It should be noted in passing, however, that the cell 50 may be another source of polarization mode dispersion since many liquid crystal materials have birefringent properties. With the selection of such liquid crystals, the determination of the dimensions, parameters and arrangement of the various elements of the switch/attenuator become more complicated than in the case of the optical isolator.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. An optical attenuator comprising:

a first sleeve for holding a first optical fiber;

a first polarizer of birefringent material disposed in an optical path of an optical signal from the first optical fiber such that the first polarizer separates the optical signal into rays having differing optical paths;

a liquid crystal cell disposed in the paths of the rays from the first polarizer;

a second polarizer of birefringent material disposed in the paths of the rays from the liquid crystal cell;

a plate of birefringent material having selected indices of refraction and a thickness which compensates for the difference in optical distance traveled by the rays; and a GRIN lens and a second sleeve for holding a second optical fiber, wherein the GRIN lens is disposed in the optical path of the rays from the plate to focus the rays on the end of the second optical fiber;

wherein the plate is disposed in the paths of the rays at an oblique angle relative to the rays so as to minimize walk-off.

2. An optical attenuator as claimed in claim 1, wherein the plate is between the second polarizer and the GRIN lens, and wherein the surface of the plate is aligned with the adjacent surface of the second polarizer.

3. An optical attenuator as claimed in claim 2, wherein the plate contacts the second polarizer.

4. An optical attenuator as claimed in claim 1, wherein the liquid crystal cell comprises a smectic liquid crystal.

5. An optical attenuator as claimed in claim 1, wherein the liquid crystal cell comprises a nematic liquid crystal.

6. An optical attenuator comprising:

a liquid crystal cell disposed in an optical path of an optical signal;

a first polarizer of a first birefringent material disposed in the optical path, the first birefringent material having a first ordinary index of refraction and a first extraordinary index of refraction, the smaller of the first ordinary index and the first extraordinary index defining a polarizer fast axis; and a plate of a second birefringent material disposed in the optical path on the same side of the liquid crystal cell as the first polarizer, the second birefringent material having a second ordinary index of refraction and a second extraordinary index of refraction, the smaller of the secondary ordinary index and the second extraordinary index defining a plate fast axis;

wherein the plate is disposed in the paths of the rays at an oblique angle relative to the rays so as to minimize walk-off, and wherein the plate fast axis is perpendicular to the first polarizer fast axis so that the polarization mode dispersion of the optical signal through the attenuator is substantially reduced.

7. An optical attenuator as in claim 6, wherein an optical axis of the plate is parallel to an optical axis of the first polarizer.

8. An optical attenuator as claimed in claim 7, wherein the first polarizer fast axis is defined by the first extraordinary index, and wherein the plate fast axis is defined by the second ordinary index.

9. An optical attenuator as claimed in claim 7, wherein the first birefringent material comprises lithium niobate and the second birefringent material comprises rutile.

10. An optical attenuator as claimed in claim 7, wherein the first polarizer fast axis is defined by the first ordinary index, and wherein the plate fast axis is defined by the second extraordinary index.

11. An optical attenuator as claimed in claim 7, wherein the first birefringent material comprises rutile and the second birefringent material comprises lithium niobate.

12. An optical attenuator as claimed in claim 6, further comprising a second polarizer of the first birefringent material disposed in the optical path on an opposite side of the liquid crystal cell from the first polarizer.

13. An optical attenuator as claimed in claim 12, further comprising a GRIN lens disposed in the optical path from the plate opposite the liquid crystal cell, the first polarizer, and the second polarizer.

14. An optical attenuator as claimed in claim 6, wherein adjacent surfaces of the first polarizer and the plate are oblique to the optical path and parallel to each other.

15. An optical attenuator for optical fibers comprising:

a first sleeve for holding a first optical fiber;

a first polarizer disposed in an optical path of an optical signal from the first optical fiber, the first polarizer comprising rutile to separate the optical signal into an ordinary ray and an extraordinary ray;

a liquid crystal cell disposed in the paths of the rays from the first polarizer;

a second polarizer comprising rutile disposed in the paths of the rays from the liquid crystal cell for orienting the ordinary and extraordinary rays along separated parallel paths, the second polarizer having a polarizer fast axis defined by an ordinary index of refraction and an exit surface opposite the liquid crystal cell which is disposed at an oblique angle relative to the rays;

a plate comprising lithium niobate disposed in the optical path from the second polarizer at an angle parallel to the exit surface, the plate having a fast axis defined by an extraordinary index of refraction, an optical axis parallel to an optical axis of the first polarizer, and a thickness which compensates for the difference in optical paths of the ordinary ray and extraordinary ray; and a GRIN lens disposed in the optical paths of the rays from the plate opposite the second polarizer.

16. An optical attenuator as claimed in claim 15, wherein the liquid crystal cell is capable of rotating the rays so that no signal reaches the GRIN lens, thereby allowing the attenuator to operate as a switch.

* * * * *